United States Patent
Wohlert

(10) Patent No.: US 7,385,304 B1
(45) Date of Patent: Jun. 10, 2008

(54) WIND WARNING SYSTEM

(76) Inventor: Troy B. Wohlert, 10354 Prairie Dell, Shipman, IL (US) 62685

(*) Notice: Subject to any disclaimer, the term of this patent is extended or adjusted under 35 U.S.C. 154(b) by 0 days.

(21) Appl. No.: 11/532,739

(22) Filed: Sep. 18, 2006

(51) Int. Cl.
*F03D 9/00* (2006.01)
*H02P 9/04* (2006.01)

(52) U.S. Cl. .................. 290/55; 290/44; 73/170.11; 73/170.01

(58) Field of Classification Search ........... 290/55, 290/54, 44, 43; 73/170.05, 170.11, 170.16; 340/601; 416/132 B; 415/907, 905, 4.2, 415/4.1, 2.1
See application file for complete search history.

(56) References Cited

U.S. PATENT DOCUMENTS

| | | | | |
|---|---|---|---|---|
| 1,633,460 | A * | 6/1927 | Silvestrin | 416/150 |
| 4,034,174 | A * | 7/1977 | McCord | 200/81.9 R |
| 4,453,154 | A * | 6/1984 | Rait et al. | 340/970 |
| D279,293 | S | 6/1985 | Sutz | |
| 4,658,645 | A * | 4/1987 | Petersen, Jr. | 73/170.16 |
| 5,021,619 | A * | 6/1991 | Hutchinson | 200/81.9 M |
| 5,038,607 | A * | 8/1991 | Baer et al. | 73/170.11 |
| 5,349,334 | A * | 9/1994 | Parson | 340/601 |
| 5,355,350 | A * | 10/1994 | Bass et al. | 367/13 |
| 5,361,633 | A | 11/1994 | Peet, II | |
| 5,469,738 | A * | 11/1995 | Hendrickson | 73/170.07 |
| 5,546,815 | A | 8/1996 | Wittry | |
| 5,918,276 | A * | 6/1999 | Grindle et al. | 73/170.11 |
| 6,310,554 | B1 | 10/2001 | Carrell | |
| 6,925,385 | B2 * | 8/2005 | Ghosh et al. | 702/14 |

* cited by examiner

*Primary Examiner*—Julio C. Gonzalez
(74) *Attorney, Agent, or Firm*—Advantia Law Group; Michael W. Starkweather; Jason P. Webb

(57) ABSTRACT

A wind warning system. The system includes: an alarm module configured to provide a audio signal; a power module configured to provide power to the alarm module; and a trigger module configured to trigger actuation of the alarm module. There is also a wind-speed sensor module configured to provide a signal to the trigger module when wind is detected having a speed higher than a predetermined threshold. The trigger module includes an electrically conductive protruding member. The wind-speed sensor module includes: a shaft member; a fan rotatably and slidably coupled to the shaft member; and a bias member coupled to the shaft member and in mechanical communication with the fan. Additionally, there is: a vertical shaft coupled to the shaft member; a tower rotatably coupled to the vertical shaft member. Moreover, there is an adjustment device that selectably adjusts a tension of the bias member, thereby altering a threshold.

2 Claims, 2 Drawing Sheets

WIND WARNING SYSTEM

BACKGROUND OF THE INVENTION

1. Field of the Invention

The present invention relates to wind speed and direction monitoring systems, specifically a wind warning system that sounds an audible alert upon detection of strong winds.

2. Description of the Related Art

In the related art, it has been known to use wind direction and speed monitoring systems to predict wind speeds associated with hazardous weather conditions. High winds associated with thunderstorms, hurricanes, tornadoes, and other sever weather phenomena frequently result in severe property damage, personal injury, and death. It is well known that advance warning of destructive wind speeds is crucial to minimizing potentially devastating outcomes. Individuals are frequently caught unaware of fast approaching and rapidly changing bad weather conditions. As a result, they aren't afforded sufficient lead time necessary to take precautionary measures to protect themselves and safeguard valuable equipment. Some improvements have been made in the field. Examples include but are not limited to the references described below, which references are incorporated by reference herein:

U.S. Pat. No. 6,310,554, issued to Carrell, discloses a severe weather detection apparatus for detecting severe weather and method of detecting and warning of approaching severe weather conditions is provided. The severe weather detector apparatus includes a barometric pressure sensor and computerized means for calculating the rate of change in the barometric pressure. By monitoring and deriving a value representative of the rate of change in the barometric pressure over time, a threshold is established and compared to the current rate of change in the barometric pressure. The derived rate of change is compared to a value stored in the device which reflects approaching severe weather conditions. Rates of change which may indicate the approach of severe weather activate a voice-enunciated alarm that announces the potentially dangerous barometric activity. The severe weather detection apparatus is portable and suitable for battery power and installation in the same manner as a home smoke alarm or carbon monoxide detector. A reduced voltage 'sleep-mode' is included to allow the device to operate for extended periods of time without maintenance or user intervention.

U.S. Pat. No. 5,918,276, issued to Grindle et al., discloses a system for monitoring the wind speed experienced at a particular residential location includes a roof housing with a cup-type anemometer having three or four concave cups attached to a rotatable vertical shaft. The cups resist the wind, causing the cups and shaft to rotate at a rate proportional to the wind speed. Shaft is rotatably joined to a dynamo which converts the mechanical energy derived from rotation of the shaft into electricity. Voltage from the dynamo is then transferred to rechargeable batteries which power the system. An array of solar panels is also utilized to recharge the batteries. The shaft includes a mark detectable by a photomicrosensor through which the shaft extends, allowing the photomicrosensor to count the number of shaft revolutions. This data is sent at fixed time intervals to a logic circuit housed within a display unit. The logic circuit calculates wind speed according to the number of shaft revolutions detected within a fixed time interval. An LED on the display unit corresponding to an appropriate Beaufort Scale wind classification is then activated and the wind speed is digitally displayed. An audible alarm within the display unit is activated if the wind speed exceeds a predetermined speed.

U.S. Pat. No. 5,469,738, issued to Hendrickson, discloses a wind speed indicator includes a series of spaced individual indicia provided on a member which is rotatable in response to movement of air caused by the wind. The indicia may take the form of individual dots spaced equally about the circumference of a circle centered on the axis of rotation of the rotatable member so that, when the rotatable member is rotated, the dots cooperate to define a virtual ring when rotated above a predetermined angular velocity in response to a predetermined threshold wind speed. Additional series of individual indicia, such as dots, are formed about succeeding smaller concentric circles and are spaced farther apart. As wind speed increases, additional virtual rings are apparent to indicate when wind speed has exceeded additional predetermined thresholds. The indicia can either be provided on an impeller which is directly rotated by the wind, or on a rotatable member which is rotatably driven in response to rotation of a separate impeller rotatably driven by the wind. In a preferred form, the components are incorporated into a system resembling that of a weather vane in order to simultaneously provide an indication of wind direction and an indication of wind speed.

U.S. Pat. No. 5,546,815, issued to Wittry, discloses an improved digital wind-speed meter based on a digital optical tachometer that may also be used independently to measure the angular velocity of propellers or fans. The improved wind-speed meter consists of a turbine mounted between two bearings and containing a polished metal cylinder with alternate reflecting and non-reflecting peripheral regions to change the light reflected by lamp into a light guide, e.g. plastic rod, which conducts light to the digital optical tachometer. The turbine head, containing a mounting tube may be rotated about this tube's axis to change the direction of the display relative to the wind direction. By changing the direction of the display in this way, the wind-speed meter provides easier and more convenient use than existing wind-speed meters when measuring the wind speed produced by fans or propellers, or the airspeed of wind-propelled craft such as sailboats and gliders.

U.S. Pat. No. 5,361,633, issued to Peet, II, discloses an apparatus for measuring wind speed and direction includes: a wind vane having a permanent magnet, an anemometer having a permanent magnet and a ferromagnetic member, and a stationary housing having radially and axially mounted reed switches. As the anemometer spins, the anemometer magnet closes the radially mounted reed switch once per revolution. This produces a signal having a frequency proportional to wind speed. The wind vane magnet rotates around the housing to a point determined by the wind direction, producing enough flux to keep the axially mounted reed switch closed. The ferromagnetic member is interposed between the magnet in the wind vane and the axially mounted reed switch once per revolution. This draws flux away from the axially mounted reed switch, allowing it to open. The result is a second output signal having a phase difference, relative to the first output signal, that depends on the wind direction. The direction of the fluid flow is determined by computing the phase difference. The housing has a mounting assembly including tapered, grooved mounting members, and a locking collar with a circumferential land to engage the grooves. The housing may be mounted at any azimuthal angle. Calibration compensates for the mounting angle.

U.S. Design Pat. No. D279,293, issued to Sutz, discloses the ornamental design for a windmill.

The inventions heretofore known suffer from a number of disadvantages which include being: difficult to install/operate, limited applicability, expensive and/or otherwise fails to detect winds associated with approaching storms, and/or fails to provide users sufficient lead time to take precautionary measures to protect themselves from strong wind speeds.

What is needed is a wind warning system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available wind speed and direction monitoring systems. Accordingly, the present invention has been developed to provide a wind warning system that sounds an audible alert upon detection of strong winds.

In one embodiment, there is a wind warning system that may include: an alarm module that may be configured to provide a audio signal; a power module that may be in communication with the alarm module and/or may provide power thereto; and/or a trigger module that may be in signal communication with the alarm module and/or may be configured to trigger actuation of the alarm module.

Additionally, there is a wind-speed sensor module that may be in signal communication with the trigger module and/or may be configured to provide a signal to the trigger module when wind is detected having a speed higher than a predetermined threshold. The wind-speed sensor module may include the following parts: a shaft member; and/or a fan that may be rotatably and/or may be slidably coupled to the shaft member; and/or a bias member that may be coupled to the shaft member and in mechanical communication with the fan.

One embodiment of the present invention may include: a vertical shaft that may be coupled to the shaft member; and/or may have a tower that may be rotatably coupled thereon.

In another embodiment, the trigger module may include an electrically conductive protruding member that may be in mechanical communication with the bias member.

In yet another embodiment, the wind-speed sensor module may include an adjustment device that may be in mechanical communication with the bias member, wherein the adjustment device may selectably adjust a tension of the bias member, thereby altering a threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
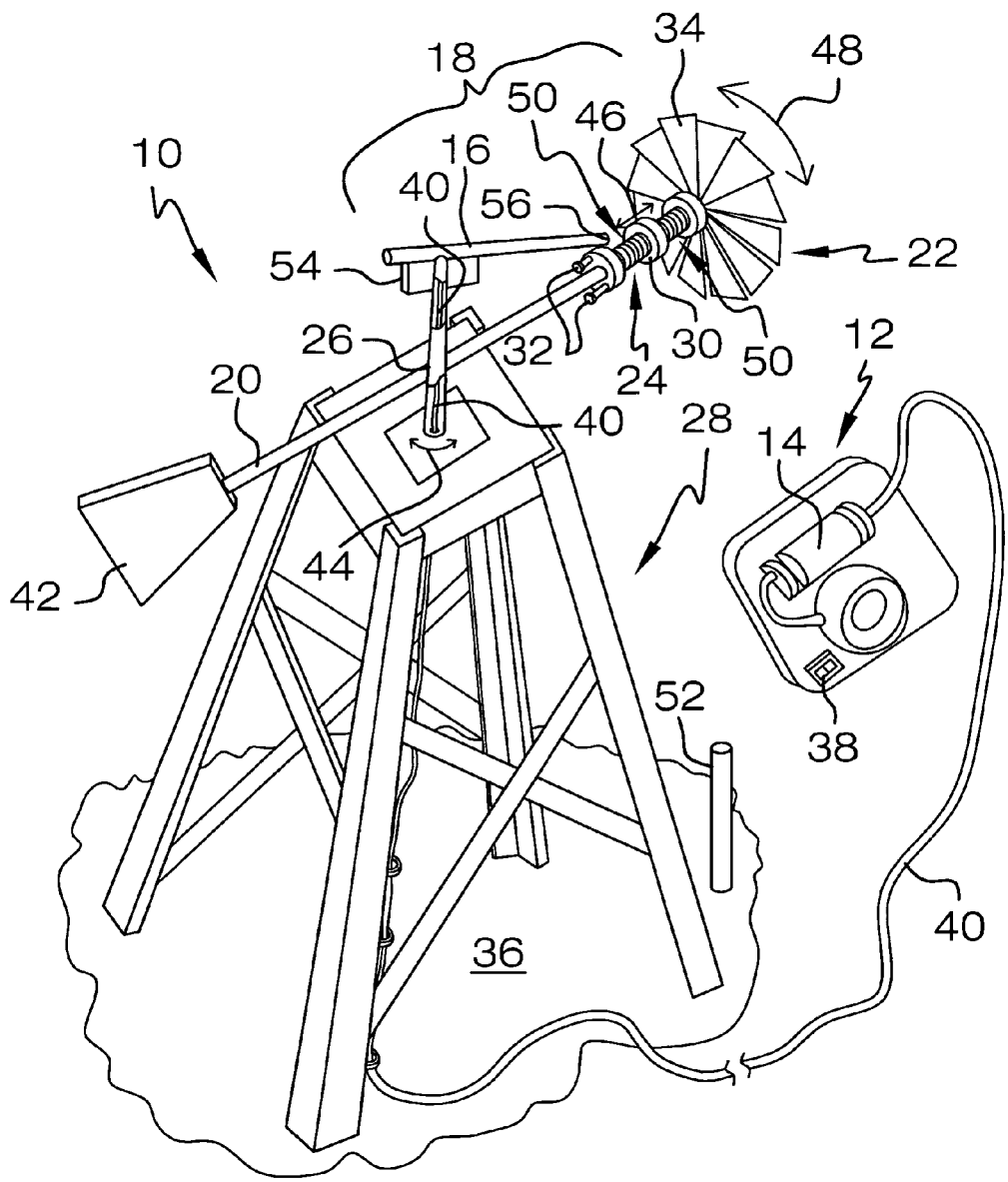
FIG. 1 is a front perspective view of a wind warning system; according to one embodiment.
Figure 2:
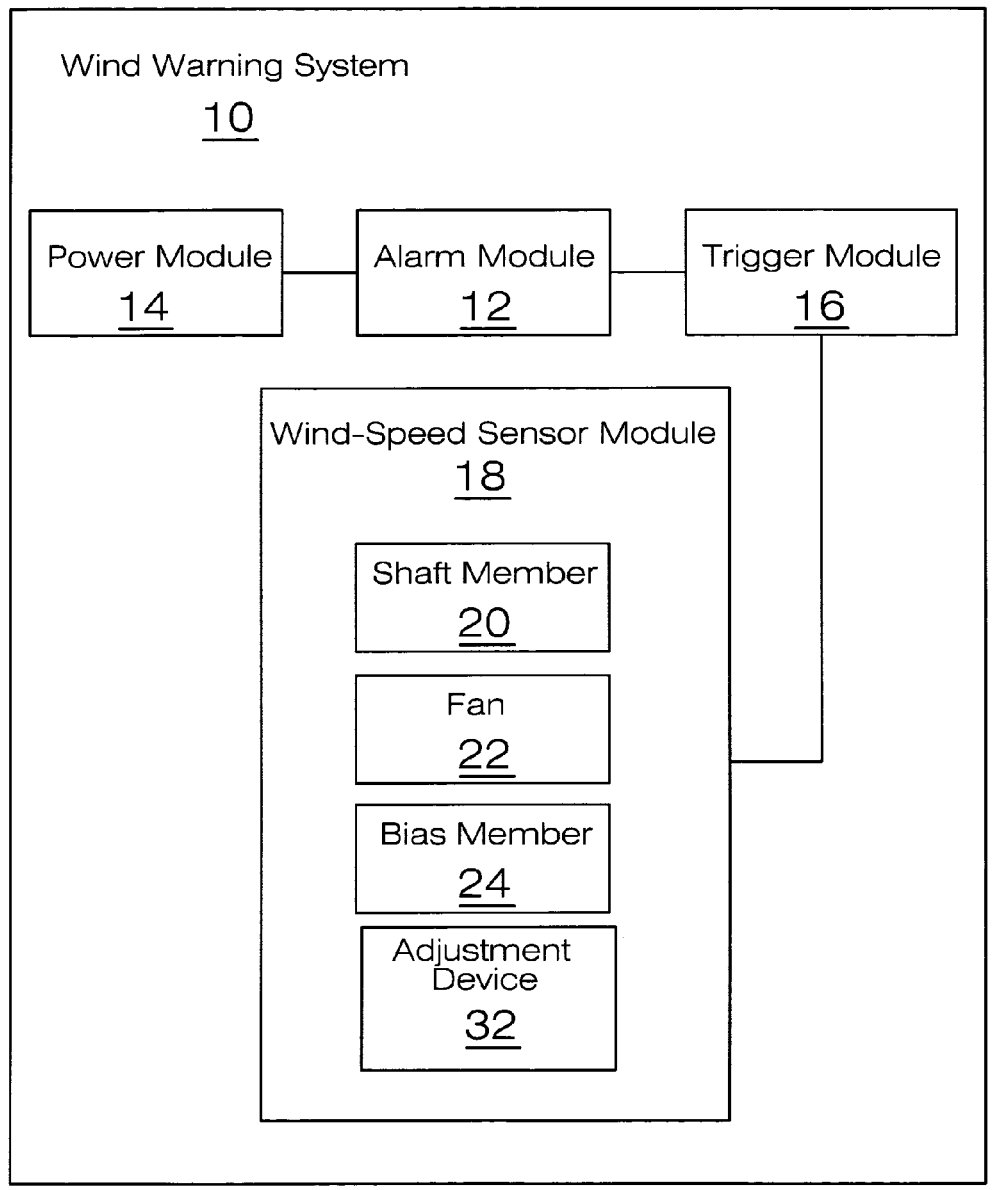
FIG. 2 is a block diagram of a wind warning system; according to one embodiment.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Looking to the figures, there is an illustrated embodiment of a wind warning system 10 that includes: an alarm module 12 configured to provide a audio signal; a power module 14 in electrical communication with the alarm module, and configured to provide direct current (DC)-power thereto; a trigger module 16 in signal communication with the alarm module, and configured to trigger actuation of the alarm module. The power module includes a rechargeable 12-volt battery housed therein. A non-limiting example of such a battery is the Cabela's Rechargeable 12-Volt Battery and Charger, Cabela's Inc, 9380 West Glendale Ave, Glendale, Ariz. 83505. In addition, a non-limiting example of the alarm module is a horn. Further, another non-limiting example of the alarm module is a 200-WS-A Dual Set Point Wind Alarm, NovaLynx Corporation, 4055 Grass Valley Highway, Suite 102, Auburn, Calif. 95602.

Additionally, there is a wind-speed sensor module 18 in signal communication with the trigger module, and configured to provide a signal to the trigger module 16 when wind is detected having a speed higher than a predetermined threshold. The wind-speed sensor module includes: a shaft member 20; a fan 22 rotatably and slidably coupled to the shaft member; and a bias member 24 coupled to the shaft member and in mechanical communication with the fan. As shown, there is a vertical shaft 26 fixedly coupled to the shaft member, having a tower 28 rotatably coupled thereon.

According to one embodiment, the trigger module 16 includes an electrically conductive protruding member 30 in mechanical communication with the bias member 24. There is also a pair of springs 50 on both sides of the protruding member, are configured to compress whenever the trigger module is actuated by strong winds and retract whenever strong winds subside.

According to one embodiment, the wind-speed sensor module 18, as illustrated, includes an adjustment device 32 in mechanical communication with the bias member 24, wherein the adjustment device is arranged to selectably adjust a tension of the bias member, thereby altering a wind speed threshold.

In operation, the user can mount the wind warning system 10 either a ground or surface 36, in any open area that is away from a plurality of structures. The user then mount the alert module 12, having the power module 14 and an Off/On switch 38 disposed thereon, to any wall into his or her residence. The user then activates the wind warning system by placing the switch to the "On" mode. The alarm module then can electrically communicate with the trigger module 16 via a grounding wire 40 that is connected to the power module and runs from the alert module, through the interior of the vertical shaft member, into the trigger module.

Whenever the surface winds increase to high speeds due to convective severe weather events such as tornadoes, hurricanes, thunderstorms, etc., the winds apply an external force to the wind-speed sensor module 18. This force causes the fan blades 34 to rotate, as indicated by arrow 48, as well as the vertical shaft 26 to rotate, as indicated by arrow 44. The rotating vertical shaft causes the shaft member 20 to rotate in the direction of the surface wind. In addition, there is a vane 42 coupled to the end of the shaft opposite the fan 22, in order to keep the shaft member pointing in the prevailing direction of the strong winds.

As the fan 22 is rotating, the force applied against the fan causes the bias member springs 50 to compress, as indicated by arrow 46, allowing the protruding member 30 to move toward the tip 56 of the trigger module 16. Once the protruding member is engaged with the trigger module, an electric signal is sent through the grounding wire 40 to the alarm module 12, thereby inducing an audio sound that alerts the occupants of strong destructive surface winds. Further, the user can selectably rotatably adjust the adjustment device 32, thereby making it harder or easier for the springs 50 to be compressed. The harder it is for the springs 50 to be compressed, the stronger the surface winds must be to trigger an alert from the alarm module. Likewise, the easier it is for the springs to be compressed, the weaker the winds must be to trigger an alert.

When the storm passes or dissipates and the surface winds subside accordingly, there is no longer a force being applied to the wind sensor module 18. This causes the springs to retract, enabling the protruding member 30 to disengage from the trigger module 16. As a result, the electrical communication between the trigger module and alarm module is disrupted, causing the audio alerts to the user to cease. During good weather conditions with relatively calm winds, the user may place the switch 38 into the "Off" mode, thereby conserving the life of the power module 14.

Further, one embodiment of the present invention may include a lightning rod 52 that can be inserted into the ground, thereby minimizing the possibility of the system 10 to be damaged due to lightning strikes.

The wind warning system 10 fulfills the need for a method of alerting people of strong wind speeds associated with approaching severe weather storms such as hurricanes, typhoons, tornadoes, thunderstorms, etc. The system is configured to automatically alert occupants of a structure of impending destructive winds. As a result, individuals are afforded sufficient lead time to take precautionary methods, such as entering a storm shelter, basement, or related safe areas.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Although the figure illustrates the fan 22 having a plurality of triangular shaped blades 34, one skilled in the art would know that the fan blades may be shaped differently, according to various embodiments. For example, circular, parabolic, etc.

Additionally, although the figures illustrate the wind warning system 10 being mounted on the ground, the system may be mounted on the roof of various structures, according to various embodiments.

It is envisioned that the power module 14 may be in the form of an electric motor, according to various embodiments.

It is expected that there could be numerous variations of the design of this invention. An example is that the length, width, shape, size, diameter, etc. of the alert module 12; shaft member 20; fan 22; bias member 24; vertical shaft 26; tower 28; protruding member 30; adjustment device 32; grounding wire 40; vane 42; springs 50; and/or lightning rod 52 may vary, according to various embodiments.

Finally, it is envisioned that the components of the device may be constructed of a variety of materials, such as wood, metal, aluminum, steel, metal alloys, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:
1. A wind warning system, comprising:
a) an alarm module configured to provide a audio signal;
b) a power module in communication with the alarm module and providing power thereto; and
c) a trigger module in signal communication with the alarm module and configured to trigger actuation of the alarm module, wherein the trigger module includes an electrically conductive protruding member in mechanical communication with the bias member; and
d) a wind-speed sensor module in signal communication with the trigger module and configured to provide a signal to the trigger module when wind is detected having a speed higher than a predetermined threshold, wherein the wind-speed sensor module includes an adjustment device in mechanical communication with the bias member, wherein the adjustment device selectable adjusts a tension of the bias member, thereby altering a threshold, the wind-speed sensor module including:
d1) a shaft member;
d2) a fan rotatably and slidably coupled to the shaft member; and
d3) a bias member coupled to the shaft member and in mechanical communication with the fan;
e) a vertical shaft coupled to the shaft member; and
f) a tower rotatable coupled to the vertical shaft member.
2. A wind warning system, consisting essentially of:
a) an alarm module configured to provide a audio signal;
b) a power module in communication with the alarm module and providing power thereto; and
c) a trigger module in signal communication with the alarm module and configured to trigger actuation of the alarm module, wherein the trigger module includes an electrically conductive protruding member in mechanical communication with the bias member;
d) a wind-speed sensor module in signal communication with the trigger module and configured to provide a signal to the trigger module when wind is detected having a speed higher than a predetermined threshold, wherein the wind-speed sensor module includes an adjustment device in mechanical communication with the bias member, wherein the adjustment device selectable adjusts a tension of the bias member, thereby altering a threshold, the wind-speed sensor module including:
d1) a shaft member;
d2) a fan rotatably and slidably coupled to the shaft member; and
d3) a bias member coupled to the shaft member and in mechanical communication with the fan;
e) a vertical shaft coupled to the shaft member; and
f) a tower rotatably coupled to the vertical shaft member.

* * * * *